United States Patent Office 2,879,151
Patented Mar. 24, 1959

2,879,151

METHOD OF PRODUCING LIQUID ORGANIC PLANT FOOD

William J. Melville, Milwaukee, Wis.

No Drawing. Application November 7, 1955
Serial No. 545,529

1 Claim. (Cl. 71—8)

This invention appertains to a liquid organic plant food and to the process of making the same.

Our soils are rapidly losing their ability to properly manufacture the needed plant food due, primarily, to the fact that we are robbing our soils of much needed bacteria and the necessary nutrients to promote and stimulate proper plant growth without giving thought toward replenishing or balancing these natural elements as nature intended. In other words, present methods tend to short circuit nature in an effort to produce more and more plants, crops, etc. In doing this, however, an unbalancing of the soil by exhausting bacteria and necessary nutrients takes place, so that, if we continue at our present rapid rate we will in a matter of about twenty-five years damage our soils beyond repair. In some localities this damage has already been accomplished.

It is, therefore, a primary object of my present invention to provide a liquid organic plant food containing all of the essential plant nutrients, proteins, vitamins, plant hormones, and mineral elements in a condition that makes these essential elements immediately available to the plant.

Another important object of my present invention is to provide a liquid organic plant food in which all the essential elements are already properly balanced so that the plant may quickly and easily assimilate the necessary plant nutrients, thus requiring very little balancing action from the soil itself.

A salient feature of my present invention also lies in the process for making my novel liquid organic plant food wherein one of the by-products of the process is extremely high in bacteria count and may be utilized to reinoculate a poor soil with the necessary live bacteria so that the soil itself may be conditioned to increase its water holding capacity and ability to manufacture and balance the necessary plant foods.

A further object of my present invention is to provide a liquid organic plant food of the above character possessing the color of deep rich nutritious earth in which there is very little, if any, obnoxious odor.

Still another object of my present invention is provide a liquid organic plant food in which, during one stage of manufacture, the energized bacteria transforms the mineral elements into soluble plant food and also stabilizes the color so that in the end product the color does not separate and there is no settling of the contents, all ingredients being perfectly blended together, as nature intended.

With these and other objects in view and to the end of attaining any other advantage hereinafter appearing, this invention consists in providing a novel organic plant food and method or process of making the same, hereinafter more fully described and pointed out in the claim.

My new liquid organic plant food is a stable liquid the color of rich nutritious earth and contains essential plant nutrients, proteins, vitamins, plant hormones, and mineral elements, all blended and balanced by a special process which will be more fully described in detail.

It should be noted that the proportions given below in the description of the process may be varied somewhat without harming the end product and that the weights given are merely for the purpose of explanation and may be varied as desired as long as the approximate proportion of each element is present.

In my novel process I first mix 25 lbs. of my organic composted material, made from dairy cattle manure which is made under controlled conditions to prevent leaching and loss of essential materials, with 1 lb. of brewer's dried yeast. My novel dairy cattle manure compost contains plant hormones, proteins, mineral elements, and bacteria as set forth below as Element 1; and the brewer's dried yeast contains water soluble vitamins, amino acids, and mineral elements in the approximate proportions set forth below as Element 2. I may, of course, use any type organic compost in lieu of my own composted material, although it is obviously preferable to use my own compost.

This mixture is well moistened and placed in trays, and these trays are usually set one above the other in any suitable rack and the bottoms of the trays are perforated so that moisture and liquid may drain progressively therethrough. I prefer to divide the above mixture into five trays but a more or less number may be used if desired. Further decomposition of the organic materials by the bacteria immediately starts to take place and these materials are allowed to ferment for twenty-four hours to several days, depending on the temperature of the air, and I have found that the desired temperature range should be between 72 and 74 degrees. I may, of course, allow the mixture to ferment in an open pile or the like, if desired. The bacteria will then convert the proteins found mainly in the dried brewer's yeast into amino acids and brings about a balancing of all of the natural elements, the various vitamins, proteins, and carbohydrates.

When the mixture has completed its fermentation, the soluble ingredients are flushed out with water and the water progresses downwardly through the series of trays and is collected in a suitable vat. I use about 4 or 5 gallons to the above amount of mixture before I change the bottom tray. In replenishing the mixture as the water takes out all of the essential elements mentioned above, I place a fresh tray at the bottom and remove the most used tray from the top, of course moving each tray up progressively. The liquid now contains a large amount of beneficial bacteria as well as the amino acids and a balancing of the natural elements, proteins, vitamins, and carbohydrates.

Bacteria are the simplest form of plant life consisting of single cells of varying shapes which reproduce by simple division at an exceedingly rapid rate if proper environmental conditions are available. The changes attributed to bacteria are caused by chemical substances produced by bacteria and known as enzymes. These substances act upon various insoluble material, changing their form and making them usable as nutrients for the bacteria, and the bacteria then further changes these into sugars, acids, alcohols, and various soluble nitrogenous compounds. In my process, the nutrients for the bacteria come from such material listed as Element 1 (the decomposable dairy cattle manure) and Element 2 (dried brewer's yeast), and this brings about greater bacterial activity which also changes the proteins to amino acids. Soluble compounds of nitrogen, carbon, hydrogen, sulphur, oxygen, phosphorous, potassium, magnesium, and others are formed by the increased bacterial activity. Into this group of nutrients now found in the liquid residue, we again balance higher amounts of proteins and vitamins (a nitrogenous substance essential to the diet of man, birds and plants). To accomplish this, I add one pound of mineral elements (set forth as Element 3 below) into every four gallons of this liquid residue and the mineral elements present are a scientific blend of fourteen or more elements known to be essential to plant health, and in particular, for balanced growth of all plants.

After the one pound of the above mineral elements has been thoroughly mixed with the four gallons of liquid, a further bacterial action takes place, balancing all of the nutrients, natural mineral elements, vitamins, proteins, carbohydrates, and organic acids, and I am sure that there are additional elements essential to plant growth in my liquid plant food but which are now unknown to me. This liquid is then allowed to ferment or work for a period of several days to ten days, or until the liquid clarifies in open containers, and this depends upon the average temperature of the air, which, preferably, should again be between 72 and 74 degrees Fahrenheit.

ELEMENT 1

*Dairy cattle manure compost*

Plant hormones—Kinds and types unknown
Soluble proteins—6 to 8%
Mineral elements (natural):
    Calcium
    Phosphorous
    Potassium
    Iron
    Copper
    Manganese
    Cobalt
    Zinc
Soil bacteria—10 million per gram
25 lbs.=11,500 grams=115 billion bacteria

ELEMENT 2

*Brewer's dried yeast consisting of water soluble vitamins, amino acids, and mineral elements*

| Approximate analysis: | Percent |
|---|---|
| Protein | 45.0 |
| Fat | 1.5 |
| Fiber | 1.5 |
| Ash | 7.0 |
| Moisture | 7.0 |
| Carbohydrates by deduction N.F.E. | 39.5 |

| Minerals (ash constituents): | Percent |
|---|---|
| Calcium | 0.12 |
| Phosphorous | 1.50 |
| Potassium | 0.86 |
| Iron | 0.02 |
|  | P.p.m. |
| Copper | 35.0 |
| Manganese | 5.3 |
| Cobalt | 1.5 |
| Zinc | 38.7 |

| Vitamins: | Mg./lb. |
|---|---|
| Thiamine | 56.6 |
| Riboflavin | 16.0 |
| Niacin | 226.5 |
| Pantothenic acid | 55.2 |
| Pyridoxine | 22.6 |
| Choline | 2200.0 |
| Botaine | 544.0 |
| Biotin | 0.5 |
| Folic acid | 22.0 |
| Inositol | 2265.0 |

| Amino acids: | Percent |
|---|---|
| Arginine | 2.2 |
| Lysine | 3.4 |
| Tryptophane | 0.8 |
| Methionine | 1.0 |
| Cystine | 0.6 |
| Hiotidine | 1.3 |
| Tyrosine | 1.9 |
| Phenylalanine | 1.8 |
| Threonine | 2.5 |
| Leucine | 3.3 |
| Isoleucine | 2.7 |
| Valine | 2.4 |
| Glutamic acid | 5.2 |
| Glycine | 3.4 |

ELEMENT 3

*Mineral elements*

20% nitogen—Nitric nitrogen 4%—organic nitrogen 16%. Derived from urea and potassium nitrate.
10% available phosphoric acid (as $P_2O_5$). Derived from calcium and potassium phosphates.
20% water soluble potash (as $K_2O$). Derived from potassium nitrate, phosphate and sulfate.

|  | Percent |
|---|---|
| Sulphur from sulfates, 3.19% as sulfate | 9.55 |
| Magnesium from sulfate, 1.28% as oxide | 2.12 |
| Calcium from phosphate, 1.48% as oxide | 2.07 |
| Manganese from the sulfate, 0.39% as oxide | 0.50 |
| Iron from divalent sulfate, 0.14% as oxide | 0.20 |
| Zinc from the sulfate, 0.08% as oxide | 0.10 |
| Copper from the divalent sulfate, 0.05% as oxide | 0.07 |
| Boron from borax, 0.01% as borate | 0.05 |
| Cobalt from the divalent sulfate, 0.01% as oxide | 0.02 |
| Iodine from potassium iodide, 0.02% as iodide | 0.02 |
| Molybdenum from sodium molybdate, 0.01% as molybdate | 0.01 |
| Sodium, not more than | 0.20 |
| Chlorine, not more than | 0.05 |

The finished product is of the color of dark nutritional earth, has almost no odor, and does not separate or settle. It is believed that the bacteria action is responsible for the suspension of the essential elements in the liquid and causes these elements to remain in suspension. In my organic liquid plant food is all the essential nutritional factors and essential mineral elements and vitamins (above listed) and in a soluble form readily available for plant use.

My new liquid organic plant food can obvious be used without any danger of burning or injury to even the most tender seedling, plant or tree.

Not only will my soluble nutritional plant food produce a healthy vigorous growth, larger and longer lasting bloom, but will also produce a higher and a more balanced nutritional fruit and vegetable. It retards mildews and blights. Applied to the soil at planting time it prevents a weakness in small plants known as "damping off of seedling" and the seeds sprout and start in a shorter period of time. It increases and brings back to the fruit, vegetable and berries their own true natural flavor.

My liquid is intended to be presented to the trade as a liquid organic plant nutrient containing essential proteins, vitamins, and mineral elements which in many cases have been taken from our soils by use and erosion, resulting in a loss of flavor and resistance to disease.

The chemical factors usually used to designate the strength of fertilizers and plant foods are at a low percentage in my liquid organic plant food because these nutrients are balanced by bacterial action with other nutrients and elements and the work usually done by the soil has already been accomplished. These chemical factors are:

|  | Percent |
|---|---|
| Nitrogen | 1 |
| Phosphoric acid | .5 |
| Potash | 1 |

I again wish to stress that the used material left in the trays from step No. 1, i.e., the mixture of Elements 1 and 2 listed above, have been thoroughly flushed with water but still contains a very high count of beneficial soil bacteria, and I utilize this material to reinoculate the soil with much needed bacteria so that the soil retains its ability to hold moisture and to manufacture the balanced plant food so needed to promote and stimulate proper plant growth.

I have tested my liquid organic plant food under various conditions and have obtained remarkable results. For example, when applied to the soil near fruit trees which had previously been very weak and lacking in growth (in fact, there had been very little new growth for well over a year), it was found that within ten days to two weeks a new and healthy growth was noticeable. On another test, I treated a few vegetables in a row (in this case they happened to be pepper plants) with my plant food and within a matter of days the vegetables in which the soil had been treated were deeper in color and of a healthier growth, and within ten days they were noticeably larger than the plants in the same row but where the soil had not been treated. Another remarkable instant was when the soil around a seedling peach tree was treated with my liquid organic plant food and within three weeks a new growth which was completely healthy was apparent. This tree was infected with blister blight, and this condition was completely controlled in the three weeks period. During this period the tree had a healthy crop of fruit. I also treated the soil around six grape ivy plants and the plants produced a new growth within ten days and a condition known as "mealy bug" which was on the plants completely disappeared within three weeks of the first application of my liquid organic plant food to the soil.

From the foregoing, it is believed that the features and advantages of my invention will be readily apparent to those skilled in the art, and it will, of course, be understood that slight changes in the proportions of essential elements in my liquid organic plant food as well as minor details of the process may be resorted to without departing from the spirit of my invention or the scope of the appended claim.

I claim as new:

A method of obtaining a liquid organic plant food by flushing with water a mixture of dairy cattle manure compost and dried brewers yeast comprising, the steps of first arranging said mixture in perforated trays one above the other and allowing said mixture to work under controlled temperature of between 70 and 75 degrees Fahrenheit and moisture content for a period of 24 hours, flushing said mixture with water, said water progressing by stages through said mixture under controlled periods and under controlled temperatures again between 70 and 75 degrees Fahrenheit, drawing off said resultant liquid, adding additional mineral elements to said liquid including sulphur, magnesium, calcium, iron and zinc from sulfates, allowing said resultant liquid to work under further bacteria action and said controlled temperature for a period of several days to ten days, said resultant balanced liquid being characterized by its color of rich nutritious earth and its ability to maintain said elements in suspension.

References Cited in the file of this patent

UNITED STATES PATENTS

| | | |
|---|---|---|
| 550,545 | Thompson | Nov. 26, 1895 |
| 847,749 | Ellis | Mar. 19, 1907 |
| 1,978,102 | Clapp | Oct. 23, 1934 |
| 2,284,002 | Lontz | May 26, 1942 |
| 2,285,834 | Proctor | June 9, 1942 |
| 2,314,091 | Jones | Mar. 16, 1943 |
| 2,587,125 | Ellingson | Feb. 26, 1952 |
| 2,738,264 | Watson | Mar. 13, 1956 |
| 2,767,072 | Coanda | Oct. 16, 1956 |

FOREIGN PATENTS

| | | |
|---|---|---|
| 245,285 | Great Britain | Jan. 7, 1926 |